United States Patent [19]
Schubert

[11] Patent Number: 5,937,986
[45] Date of Patent: Aug. 17, 1999

[54] FRICTION CLUTCH, PARTICULARLY FOR MOTOR VEHICLE, COMPRISING A WEAR ADJUSTING DEVICE

[75] Inventor: Florian Schubert, Madrid, Spain

[73] Assignee: Valeo, Paris, France

[21] Appl. No.: 09/068,776

[22] PCT Filed: Sep. 17, 1997

[86] PCT No.: PCT/FR97/01646

§ 371 Date: May 15, 1998

§ 102(e) Date: May 15, 1998

[87] PCT Pub. No.: WO98/12447

PCT Pub. Date: Mar. 26, 1998

[30] Foreign Application Priority Data

Sep. 17, 1996 [FR] France ................................. 96 11297
Dec. 26, 1996 [FR] France ................................. 96 16044

[51] Int. Cl.[6] ............................................... F16D 13/75
[52] U.S. Cl. ................................. 192/70.25; 192/111 A; 74/425; 74/575; 74/577 SF
[58] Field of Search ........................... 192/70.25, 111 A; 188/196 BA; 74/425, 426, 575, 577 SF

[56] References Cited

U.S. PATENT DOCUMENTS 3,222,941 12/1965 Winslow ................................. 74/425 X
5,029,687 7/1991 Asada et al. ........................... 192/111 A
5,090,536 2/1992 Asada ..................................... 192/70.25
5,251,737 10/1993 Flotow et al. ......................... 192/111 A
5,816,379 10/1998 De Briel et al. ....................... 192/70.25

FOREIGN PATENT DOCUMENTS 2345620 10/1977 France .
2424442 11/1979 France .
2739159 3/1997 France .

*Primary Examiner*—Richard M. Lorence
*Attorney, Agent, or Firm*—Liniak, Berenato, Longacre & White

[57] ABSTRACT

The friction clutch, for a motor vehicle, includes a friction disc, a pressure plate (201), a cover plate (202) fixed on the reaction plate, and an axially acting spring (203) working between the cover plate (202) and the pressure plate (201), the pressure plate (201) being fixed to the cover plate (202) for rotation with the latter while being displaceable axially with respect to it, the clutch further including a wear compensating device comprising ramps (211) disposed circumferentially and adapted to be driven in rotation by a set of teeth (218) which they carry at the periphery, and with which a worm (213) cooperates; for driving the worm (213) in rotation, there is provided a ratchet wheel (220) fixed to the worm (213) for rotation with the latter, the worm (213) and the ratchet wheel (220) being formed in one piece: the teeth (221) of the ratchet wheel (220) are formed at the outer periphery of the thread of the worm (213).

11 Claims, 2 Drawing Sheets

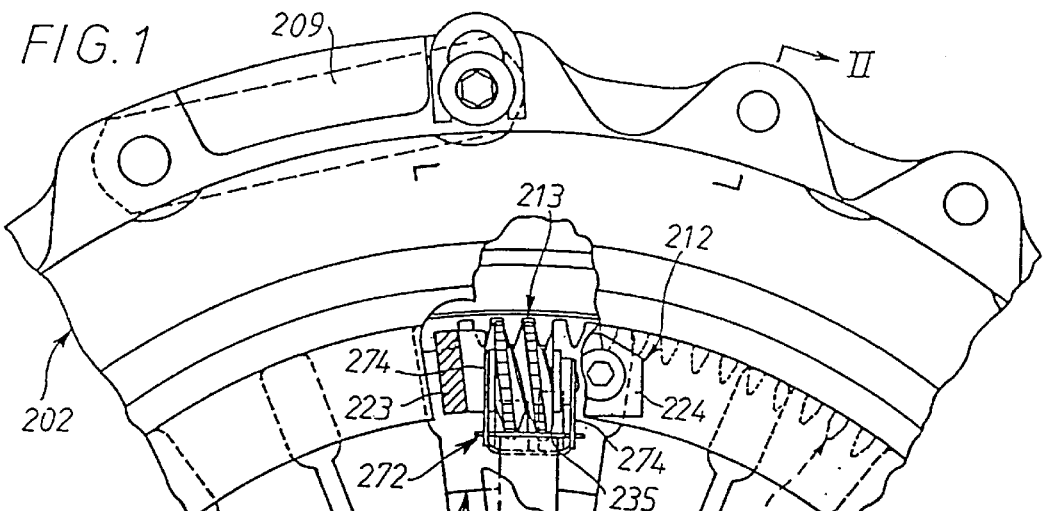
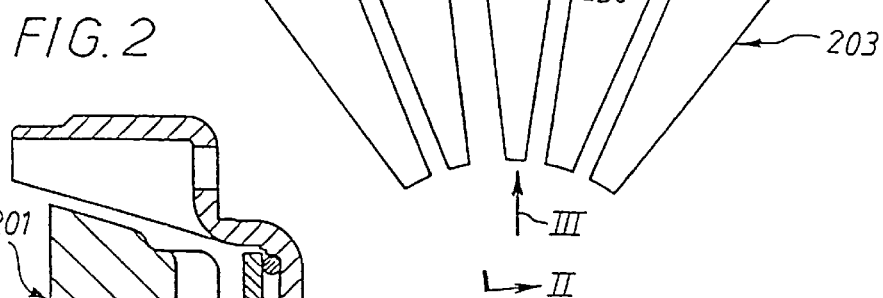
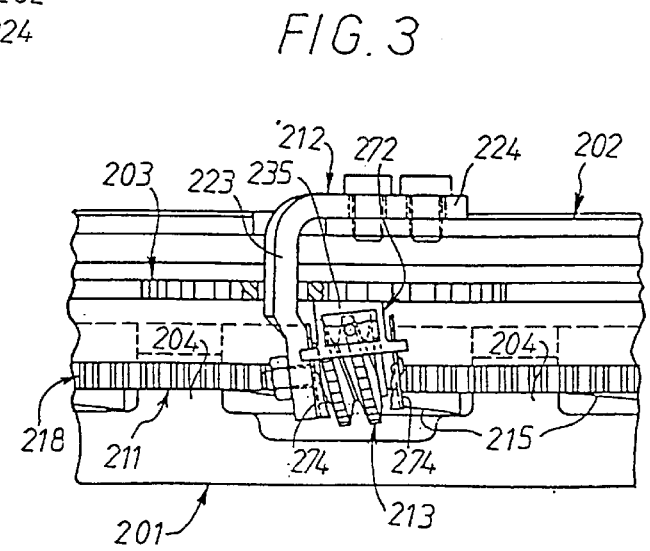

FRICTION CLUTCH, PARTICULARLY FOR MOTOR VEHICLE, COMPRISING A WEAR ADJUSTING DEVICE

The present invention relates to a friction clutch, in particular for a motor vehicle, and more particularly it relates to a clutch equipped with a wear compensating device for compensating for wear, in particular in the friction liners, the said device, referred to hereinafter as a wear compensating device, operating as the said liners become worn.

A conventional friction clutch generally includes a reaction plate, which may be in two parts so as to constitute a torsion damper, and which is mounted in rotation on a first shaft, which is typically a driving shaft such as the crankshaft of the internal combustion engine and which supports, through its outer periphery, a cover plate to which at least one pressure plate is attached.

The pressure plate is coupled in rotation to the cover plate and to the reaction plate, while being able to be displaced axially under the action of controlled axially acting resilient means, consisting generally of a metallic diaphragm which bears on the cover plate, while a friction disc, carrying friction liners at its outer periphery and fixed in rotation to a shaft, typically a driven shaft such as the input shaft of the gearbox, is interposed between the pressure plate and the reaction plate in such a way as to be gripped between them when the clutch is in an engaged condition. The diaphragm controls the axial displacement of the pressure plate when it is actuated by a clutch release bearing. More precisely, the clutch release bearing acts on the device for disengaging the clutch (the fingers of the diaphragm), which therefore counteracts the action of the means for disengaging the clutch (the peripheral part of the diaphragm, in the form of a Belleville ring) acting on the pressure plate.

In the course of the useful life of such a clutch, the friction liners become worn along with the counter materials, i.e. the pressure plate and reaction plate, and this causes variation to take place in the position of the pressure plate and those of the axially acting resilient means and the clutch release bearing, from which there follows a variation in the gripping force exerted between the friction disc on the one hand and the pressure and reaction plates on the other hand, because of the changes that take place in the working conditions (or positions) of the diaphragm, and the force necessary to disengage the clutch is consequently affected. By equipping such a clutch with a wear compensating device, these drawbacks are avoided, the diaphragm and the clutch release bearing, which is typically in constant engagement on the diaphragm, occupying generally the same position when the clutch is in its engaged condition.

There has previously been proposed, in the French patent application filed on Sep. 21, 1995 under the number 95 11090 and published under the number 2 739 159, a friction clutch, especially for a motor vehicle, of the kind comprising a reaction plate adapted to be mounted in rotation on a driving shaft, a friction disc carrying friction liners at its outer periphery and adapted to be mounted in rotation on a driven shaft, a pressure plate, a cover plate fixed on the reaction plate, axially acting resilient means acting between, firstly, the cover plate, and secondly, the pressure plate through abutment means, the pressure plate being fixed in rotation to the cover plate while being able to be displaced axially with respect thereto and being subjected to the action of resilient return means for returning the pressure plate axially towards the cover plate, the said clutch further including a wear compensating device comprising circumferentially disposed ramp means located axially between the abutment means and the pressure plate and adapted to be driven in rotation by means of a set of teeth, which they carry at their periphery and with which a worm cooperates, means for driving the worm in rotation being provided and being rendered operational by wear in the friction liners when the clutch is engaged, the means for driving the worm in rotation consisting of a ratchet wheel fixed to the worm for rotation therewith, the worm and the ratchet wheel being formed in one piece.

Such a clutch operates well and does give satisfaction.

An object of the present invention is to propose a clutch of the above type, in which the wear compensating device is simpler and more inexpensive to manufacture and is reduced in size, which can also lead to a reduction in the diametral size of the clutch.

Thus, according to the invention, a friction clutch of the above type is characterised by the fact that the teeth of the ratchet wheel are formed at the outer periphery of the thread of the worm.

Thanks to this arrangement, the single member which constitutes the worm and the ratchet wheel is simple and inexpensive to make; it is for example possible to make it by cutting it from a long workpiece of the profiled type, followed by trimming. In addition, the axial length of such a single member is short, and the worm can then cooperate with a set of teeth having a small radius of curvature: the compensating device can in consequence be placed closer to the axis of the clutch, and the diametral size of the latter is then reduced.

Advantageously, the worm is carried by a shaft supported by a support.

Preferably, the worm is mounted for sliding movement along its axis and is subjected to the action of a so-called resilient compensating means.

Advantageously, the resilient compensating means is a helical spring surrounding the shaft that carries the worm.

Advantageously, the shaft and the worm are formed in one piece; in another version, the shaft is fixed to the support and the worm is mounted for rotation on the shaft.

Advantageously, the resilient compensating means is a spring wound around the shaft and located in a housing disposed in the interior of the ratchet wheel or worm.

Advantageously, the resilient compensating means is on the outside of the worm and is made in the form of an elastic stirrup straddling the said worm.

Preferably, the support consists of at least one elastic leaf, connected on one side to the shaft around which the worm is mounted for rotation, and on the other side to the cover plate, the worm being controlled by a diaphragm constituting the axially acting resilient means.

Advantageously, the shaft is inclined with respect to a plane at right angles to the axis of the clutch, by an angle which is generally equal to that of the thread of the worm.

Advantageously, the set of teeth carried by the ramp means is disposed radially at the inner periphery of the latter.

For a better understanding of the subject matter of the invention, some embodiments, shown in the attached drawings, will now be described by way of purely illustrative and non-limiting example.

FIG. 1 is a plan view showing part of a clutch equipped with a wear compensating device in accordance with the invention;

FIG. 2 is a partial view in cross section taken on the line II—II in FIG. 1;

FIG. 3 is a partial side view in the direction of the arrow III in FIG. 1;

Figure 8:
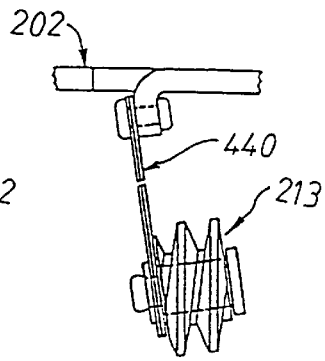
Figure 9:
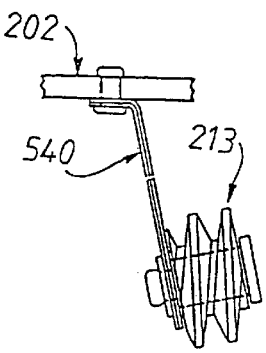
Figure 7:
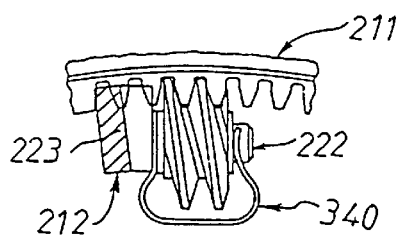
Figure 10:
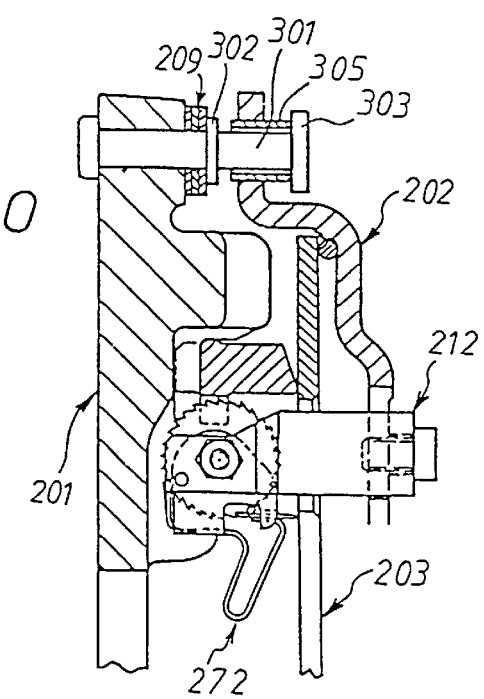

each of FIGS. 7 to 9 shows, respectively, a further version of the actuating spring;

FIG. 10 is similar to FIG. 2 and shows another version.

In the drawings, the diaphragm clutch includes a hollow cover plate 202; in this case the cover plate is of metal and is press-formed from plate.

The cover plate includes a base and means for fastening it to a reaction plate, which may be of divided form so as to constitute a damped flywheel; in the present case, the fastening means of the cover plate consist of an axially orientated annular skirt which extends a radial flange formed with holes for passage through them of fastening members, such as screws, for fastening the cover plate to the reaction plate.

In the present case, the clutch is of the pull-to-release type, so that it is necessary to work in traction on the inner ends of the fingers of the diaphragm in order to disengage (or declutch) the clutch. The outer peripheral portion of the Belleville ring of the diaphragm bears on the base of the cover plate, on a toroidal ring not denoted by a reference numeral, which is carried by the outer periphery of the base of the cover plate, or, in another version, on a projecting element press-formed in the said base. The inner peripheral portion of the said Belleville ring is in contact with an abutment to be described below. In general terms, the fingers of the diaphragm constitute declutching means for counteracting, under the action of the clutch release bearing, the action of the resilient clutch-engaging means which consist of the peripheral portion, in the form of a Belleville ring, of the diaphragm.

With reference to FIGS. 1 to 6, these show a friction clutch mechanism, especially for a motor vehicle, which comprises a pressure plate 201 adapted to cooperate, through a friction surface, with a friction disc, not shown, which carries friction liners at its outer periphery and itself cooperates with a reaction plate.

The reaction plate, not shown, is adapted to be mounted on, and for rotation with, a driving shaft such as the crankshaft of the internal combustion engine. The friction disc is fixed in rotation to a driven shaft such as the input shaft of the gearbox. The friction disc and the reaction plate are shown for example in the document FR-A-2 599 446.

The pressure plate 201 is fixed in rotation to a hollow cover plate 202 by means of tangential tongues 209, which, being elastic, also constitute return means for biasing the pressure plate 201 towards the cover plate 202.

The pressure plate 201, while being fixed in rotation to the cover plate 202, is accordingly displaceable axially with respect to the cover plate 202 under the biasing action of controlled axially acting resilient means, which in this example comprise a diaphragm 203 which bears on the cover plate 202 through its outer periphery, the clutch being here of the pull-to-release type, the operation of declutching being effected by acting on the ends of the fingers of the diaphragm in the direction of the arrow F in FIG. 2.

In order to maintain the axially acting resilient means 203, when the clutch is engaged, in a position independent of wear in the liners of the friction disc, and to a lesser extent wear in the pressure plate 201 and the reaction plate, the friction surfaces of which become worn in contact with the liners of the disc, a wear compensating device is provided which includes ramp means 211 disposed circumferentially; more precisely, these ramp means 211, FIGS. 2 and 3, are of metal and comprise an annular ring having ramps 215 disposed circumferentially on its face that faces towards the pressure plate 201; on its opposite face, the said ring has an engagement zone 214 which consists of an upper edge disposed on an arc of a circle centred on the axis of the clutch. The said engagement zone 214 may of course be either continuous or discontinuous.

The pressure plate 201 has, on its surface facing towards the base of the cover plate 202, machined pads 204 which in this example are formed integrally by moulding and which are spaced apart circumferentially by a distance which corresponds to the distance circumferentially separating two successive ramps 215, each of the pads 204 being adapted to cooperate with one ramp 215, and being preferably chamfered for this purpose.

The ramp means 211 are located axially between the diaphragm 203 and the pressure plate 201, in such a way that the pads 204 receive the ramps 215, and the diaphragm 203 cooperates with the engagement zone 214, which thus constitutes the abutment means through which the diaphragm 203 acts on the pressure plate 201.

The inner periphery of the ramp means 211 is provided with a set of radial teeth 218.

The wear compensating device also includes a ratchet wheel 220 having ratchet teeth 221, which is mounted for rotation about a shaft 222 which also carries a worm 213; the angle and pitch of the worm 213 are matched to the set of teeth 218 of the ramp means 211; the worm 213 is arranged to cooperate with the set of teeth 218 under the conditions which will be described later herein, the system consisting of the worm 13 and the teeth 218 being irreversible, the worm 213 being able to drive the teeth 218 but not the other way round.

Figure 4:
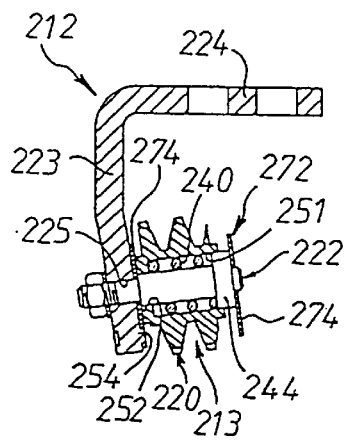
FIG. 4 is a view in cross section of the support showing the worm.
Figure 5:
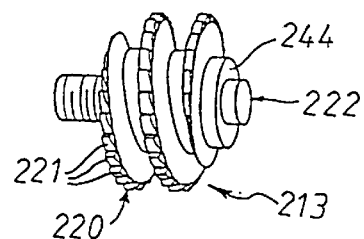
FIG. 5 is a perspective view of the worm incorporating the ratchet wheel.

According to the invention, the teeth 221 are formed in the outer periphery of the thread of the worm 213. This arrangement, which is best seen in FIGS. 4 and 5, is both inexpensive and simple. In addition, as can be seen in FIGS. 1 and 2, the compensating device is short in length and can be fitted in a region close to the centre of the clutch; the set of teeth 218 is formed at the inner periphery of the ramp means 211, and the diametral size of the ramp means 211, and in consequence that of the pressure plate 201 and cover plate 202, is reduced.

The shaft 222 is carried by a support piece 212, which is best seen in FIGS. 3 and 4 and which is made of press-formed and bent sheet metal, being generally L-shaped and having two wing portions 223, 224, one of which, 223, is arranged to support the shaft 222, with the other one, 224, being arranged to fix the support piece 212 on the cover plate 202; for this purpose, the wing portion 223 has a circular hole 225 which is arranged to receive the end of the shaft 222, which is threaded in this example so as to receive a fastening nut. In a modified version not shown, the wing portion 223 is formed with a screw thread which receives the threaded end of the shaft 222, and this enables the nut to be dispensed with.

When the support piece 212 is mounted on the cover plate 202, the wing portion 224 is fixed on the base of the cover plate 202, while the wing portion 223 extends through the diaphragm 203 between two of its fingers, which may if necessary be spaced apart circumferentially by a greater amount than are the other pairs of fingers. In another version, the support is an integral part of the cover plate.

Figure 6:
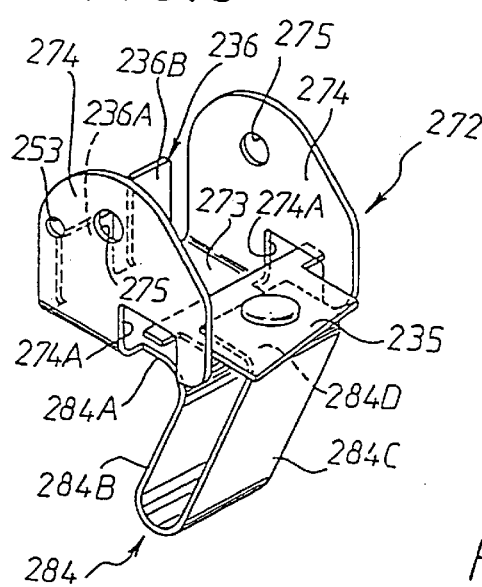
FIG. 6 is a perspective view of the resilient member.

The support piece 212 is adapted to receive a resilient member 272, which in this example is of metal and is of smaller thickness than the support piece, as is best seen in FIG. 6; the resilient member 272 is in the general form of a saddle and comprises a flat body 273 carrying at each of its ends an arm 274 having a hole 275 for receiving the shaft 222; the two arms 274 are parallel to each other and extend on the same side and generally at right angles with respect to the body 273. On one of its longitudinal edges, the body 273 is extended, between the arms 274, by an extension 284 which comprises a first portion 284A that extends the body 273 lengthwise, a second portion 284B which extends in the direction away from that of the arms 274, making an acute angle with the body 273, a third portion 284C which makes a U with the second portion 284B and which extends parallel to the latter, and a fourth portion 284D directed towards the body 273 and parallel to the latter, at a level which is slightly higher so that it extends between the arms 274; this fourth portion 284D receives, for example by riveting, a T-shaped plate element, the foot 235 of which constitutes a control tongue 235; each of the two arms of the T passes through a slot 274A formed in each of the arms 274, so that the course of travel of the control tongue 234 parallel to the body 273 is limited, at least in its spacing from the body 273; on its longitudinal edge opposite to that on which the extension 284 is situated, the body 273 carries a non-return catch 236, which in this example consists of two flat fingers 236A, 236B of slightly different lengths, extending generally at right angles to the body 273 on the same side with respect to the latter as that on which the arms 274 extend; the inner edge of the control tongue 235 and the free ends of the fingers 236A and 236B are spaced away from each other and are so positioned that, when the resilient member 272 and the ratchet wheel 220 are mounted in the support piece 212, the non-return catch 236 and the control tongue 235 each cooperate elastically with the root of a tooth of the ratchet wheel 220. The arm 274 of the resilient member 272, in engagement on the wing portion 223 of the support piece 212, has a hole 253, FIG. 6, which is arranged to cooperate with a spigot element 254, FIG. 4, which is arranged on the inner face of the said wing portion 223 for angular positioning of the resilient member 272 with respect to the support piece 212. The spigot element 254 may be replaced by a dowel or any other projecting element.

The shaft 222 carries a collar 244 in the vicinity of its unthreaded end; around the shaft 222, there is fitted a helical spring 240 which constitutes the resilient means for taking up wear as described below; in this example, the spring 240 is wound around the shaft 222 and is located in a housing 251 formed within the interior of the ratchet wheel 220 (or worm 213); the ratchet wheel 220 (or worm 213) is centred with respect to the shaft 222, on one side, by bearing on the collar 244 of the said shaft, and on the other side by an internal circular ring element 252 with which it is provided; the spring 240 is thus located axially between the said ring element 252 and the collar 244 of the shaft 222; the ratchet wheel 220 is aligned with the non-return catch 236, which, by cooperation with the ratchet teeth 221 of the ratchet wheel 220, prevents rotation of the ratchet wheel 220, and therefore of the worm 213, in the anti-clockwise direction with reference to FIG. 2.

Since the support 212, carrying the ratchet wheel 220, the worm 213 and the helical spring 240, is fixed to the cover plate 202, the diaphragm 203 is displaced with respect to the latter during the operations of disengaging and re-engaging the clutch; the diaphragm 203 is so arranged as to cooperate by means of one of its fingers, in this example the finger 250, with the control tongue 235 of the resilient member 272; it will be understood that, because of this arrangement, during the deflection of the diaphragm 203 during the clutch operations, the control tongue 235 is displaced from right to left with reference to FIG. 1, and, by cooperation with the teeth 221 of the ratchet wheel 220, is caused to rotate the ratchet wheel 220 in the clockwise direction; when the finger 250 of the diaphragm deflects to the right during the declutching operation, the elasticity of the resilient member 272 and the inclination of the teeth 221 causes the control tongue 235 to be displaced towards the right, climbing on the teeth 221 which are held fixed in rotation by the non-return catch 236.

The wear compensating device which has just been described operates as follows.

FIG. 2 shows the clutch engaged, with the liners of the friction disc being new and gripped between the reaction plate, not shown, and the pressure plate 201. In this position, the control tongue 235 and the non-return catch 236 have their ends at the root of a tooth of the ratchet wheel 220.

When the clutch is disengaged, the ends of the fingers of the diaphragm 203 are urged in the direction of the arrow F towards the base of the cover plate 202; in its displacement, the finger 250 progressively releases the control tongue 235, the end of which follows the inclined ramp defined by the tooth in the root of which it was engaged in the preceding step, the teeth 221 of the ratchet wheel 220 being so designed that, during this course of clutch disengagement with new liners, the end of the control tongue 235 does not jump a tooth, the non-return catch 236 retaining the ratchet wheel 220; this is achieved by the tongue 235 coming into abutment against the edge of the slots 274A in the wing portions 274 of the support piece 272.

When the liners are worn, the pressure plate 201, still subjected to the axial force imposed by the diaphragm 203, comes closer, in the known way, to the reaction plate, which is fixed axially as is the cover plate 202; the finger 250 of the diaphragm 203 is thus brought closer to the reaction plate and therefore to the open end of the cover plate 202, carrying the control tongue 235 in its movement; the ratchet wheel 220 rotates about its axis in the clockwise direction, this being the direction in which the non-return catch 236 does not perform its function but is able to jump from one tooth to another; this driving of the ratchet wheel 220 in rotation causes the worm 213 to rotate also on its axis; since the ramp means 211 are immobilised with respect to the cover plate 202 due to the force exerted by the diaphragm 203, the worm 213, which meshes with the teeth 218 of the ramp means 211, acts slightly on the teeth 218 so as to compress the helical spring 240, the direction of the thread of the worm 213 being determined accordingly.

During the declutching operation which follows the wear phase just described, the pressure plate 201 releases the liners by separating from them under the action of the tangential tongues 209, which displace, back towards the base of the cover plate 202, the pressure plate 201 and the ramp means 211, which are in contact with the diaphragm 203 through their engagement zones 214, and in contact with the pads 204 of the pressure plate 201 through their ramps 215. The helical spring 240 urges the worm 213 towards the wing portion 223 of the support piece 212, from which it is spaced in phases in which wear is taking place, that is to say from right to left with respect to FIGS. 3 and 4; since the load of the diaphragm 203 is no longer applied to the ramp means 211, the only force to be overcome in order to enable the ramp means 211 to rotate with respect to the pressure plate 201 is the return force exerted by the tangential tongues 209; if the load of the helical spring 240 is sufficiently high to overcome this force, then the spring 240 displaces the worm 213, which is prevented from turning on itself by the pressure from the non-return catch 236, and which will later drive the teeth 218; by turning on themselves, the ramps 215 of the ramp means 211, by cooperation with the pads 204 of the pressure plate 201, will displace the pressure plate 201 from the base of the cover plate 202, thus increasing the axial distance between the working surface of the pressure plate 201 and the engagement zones 214 of the ramp means 211, and therefore at least partly, as before, taking up the wear in the liners. Since the load of the helical spring 240 is a function of the amount by which it will have been compressed by the worm 213 during the wear phases, it can be seen that several operations of engaging and disengaging the clutch may be necessary before the device for taking up clearance enters into a wear-compensated phase proper, this being a function of the relative dimensioning of the components concerned; by way of example, the latter may be made in such a way that this wear-compensated phase proper occurs for the first time only after an amount of wear has taken place which corresponds to three tens of millimeters.

If wear has been sufficiently high for the ratchet wheel 220 to have rotated enough for the tongue 235 to jump a tooth on the return movement during the clutch engaging operation, the tongue 235, pushed by the finger 250, causes the ratchet wheel 220 to rotate, and the ramp means 211, no longer gripped by the diaphragm 203, turn so as to take up the wear; at the end of the wear take-up operation, the diaphragm, the ratchet wheel 220, the non-return catch 236 and the control tongue 235 regain the position which they occupied in FIG. 2.

Since the worm 213 and the ratchet wheel 220 are made as a single component, as can be seen, the support piece 212 equipped with this component, together with the resilient member 272, the spring 240 and the shaft 222, constitutes a sub-assembly which is ready to be installed on the cover plate 202.

In the variant which has just been described, the spring 240 is wound around the shaft 222, being lodged within the axially compact single component that constitutes the ratchet wheel 220 and the worm 213; in the version shown in FIG. 7, the spring is on the outside of the said single component, being made in the form of an elastic stirrup 340 straddling the said single component.

It is possible to achieve this elastic function by supporting the said component elastically with respect to the cover plate; thus, as is shown in FIGS. 8 and 9, resilient leaves which are connected on one side to the axis about which the said single component is mounted for rotation, and on the other side to the cover plate 202, may be used for this purpose: in FIG. 8, the leaves 440 are straight and are connected to the cover plate through a bent-back lug of the latter; in FIG. 9, it is the leaves 540 that have a lug, which is bent back for connection to the cover plate.

As is shown in FIGS. 3, 4, 8 and 9, the shaft 222 is inclined with respect to a plane at right angles to the axis of the clutch, by an angle equal to that of the thread of the worm 213; as a result of this arrangement, the teeth in the set 218 are straight teeth, which improves the transmission by meshing engagement.

As has been described earlier herein, during the clutch disengagement operation which follows a phase of wear, the pressure plate 201 releases the liners by moving away from them under the action of the tangential tongues 209, which return the pressure plate 201 and the ramp means 211 towards the base of the cover plate 202; in order to be certain that the helical spring 240 is able to actuate the ramp means 211 without any hindrance due to the axial return force exerted by the tangential tongues 209, it can be of advantage to limit the course of travel of the pressure plate 201 during declutching operations.

The modified version shown in FIG. 10 shows an arrangement which permits this; in this version, the pressure plate 201 carries an axial pin 301, which may for example be an extension of a rivet fastening the tongues 209 to the plate 201; the pin 301 carries two collars 302, 303 which define axial abutments.

A sleeve 305 surrounds the pin 301, and its axial length is smaller than the distance by which the two collars 302 and 303 are separated axially, the difference between the said lengths defining an axial clearance.

The sleeve 305 is fitted in a hole at the edge of the cover plate 202, to which it is fixed by friction, the axial abutments 302 and 303 being disposed on either side of the said edge; the said axial clearance thus defines the course of return travel of the plate 201 caused by the tongues 209; this axial clearance is constant regardless of the amount of wear in the liners; in this connection, in the event of wear in the latter, the sleeve 305 is displaced by the diaphragm force which is greater than the friction force between the sleeve 305 and the cover plate 202, which force is higher than the axial force due to the tongues 209.

In all of the foregoing, the non-return means consist of a catch which cooperates with the ratchet wheel; in another version, it consists of friction means, such as friction lugs for example.

It will be noted that the pressure plate has an axially orientated annular boss which enables the ramp means 211 to be centred internally.

It will be appreciated that the wear compensating device has low sensitivity to axial and torsional vibrations, and especially those due to axial vibrations of the crankshaft of the engine of the motor vehicle. It is also quite insensitive to the effects of centrifugal force and to thermal deformation and corrosion.

In this connection, the irreversibility of the action of the worm on a set of teeth fixed to the ramp means, coupled to the non-return means, prevent accidental operation of the wear compensating device having regard to vibrations, and also when no wear has taken place. Thus, the pressure plate is not able to drive the worm through the ramp means.

The presence of the support piece carried by the cover plate and carrying the control member and the non-return means, in combination with the centring of the ramp means by the pressure plate, enables the wear compensating device to be highly resistant to the effects of centrifugal force.

The assembly consisting of the ratchet wheel, the worm and the helical spring takes up little space, and does not hinder ventilation of the clutch.

The action of the axially acting resilient means on the control member cooperating with the ratchet means enables the wear compensating device to be disengaged.

The axially acting resilient means may take some other form, for example as described in Applications FR 97 11058 of Sep. 5, 1997, and FR 97 04213 and FR 97 04214 of Apr. 7, 1997.

Thus, with reference to FIGS. 4, 5 and 3, 4 respectively of the documents FR 97 11058 and FR 97 04214, it can be seen that a Belleville ring is mounted in series with the diaphragm so as to constitute the elastic means for engaging the clutch by axial action, the diaphragm being in contact with the control tongue directly or indirectly through the interposed means for transmitting forces that acts between the Belleville ring and the diaphragm.

The Belleville ring is a booster ring of the positive type.

This booster ring is for example dimensioned as a function of the progressive engagement means which are mounted within the friction disc.

The booster ring can of course be fitted in parallel with the diaphragm, for example by acting between the cover plate and the inner ends of the fingers of the diaphragm, in the way described in the document FR-A-2 728 638.

The wear compensating device may of course take some other form. The same is true for the support. All of the embodiments described in Application FR 96 11297 of Sep. 17, 1996 can be envisaged. Reference can for example be made to FIGS. 21, 28 and 35 of that Application, the text of which is considered as being annexed to the present Application.

I claim:

1. A friction clutch, comprising a reaction plate adapted to be mounted in rotation on a driving shaft, a friction disc carrying friction liners at its outer periphery and adapted to be mounted in rotation on a driven shaft, a pressure plate (201), a cover plate (202) fixed on the reaction plate, axially acting resilient means (203) acting between, firstly, the cover plate (202), and secondly, the pressure plate (201) through abutment means (214), the pressure plate (201) being fixed in rotation to the cover plate (202) while being able to be displaced axially with respect thereto and being subjected to the action of resilient return means (209) for returning the pressure plate (201) axially towards the cover plate (202), the said clutch further including a wear compensating device comprising circumferentially disposed ramp means (211) located axially between the abutment means (214) and the pressure plate (201) and adapted to be driven in rotation by means of a set of teeth (218), which they carry at their periphery and with which a worm (213) cooperates, means (220) for driving the worm (213) in rotation being provided and being rendered operational by wear in the friction liners when the clutch is engaged, the means (220) for driving the worm (213) in rotation consisting of a ratchet wheel fixed to the worm (213) for rotation therewith, the worm (213) and the ratchet wheel (220) being formed in one piece, characterised by the fact that the teeth (221) of the ratchet wheel (220) are formed at the outer periphery of the thread of the worm (213).

2. A friction clutch according to claim 1, characterised by the fact that the worm (213) is carried by a shaft (222) supported by a support (212).

3. A friction clutch according to claim 2, characterised by the fact that the worm (213) is mounted for sliding movement along its axis and is subjected to the action of a so-called resilient compensating means (240, 340, 440, 540).

4. A friction clutch according to claim 3, characterised by the fact that the resilient compensating means (240) is a helical spring surrounding the shaft (222) that carries the worm (213).

5. A friction clutch according to claim 2, characterised by the fact that the shaft (222) and the worm (213) are formed in one piece.

6. A friction clutch according to claim 4, characterised by the fact that the shaft (222) is fixed to the support (212), and the worm (213) is mounted for rotation on the shaft (222).

7. A friction clutch according to claim 3, characterised by the fact that the resilient compensating means is a spring (240) wound around the shaft (222) and located in a housing (251) disposed in the interior of the ratchet wheel (220) or worm (213).

8. A friction clutch according to claim 3, characterised by the fact that the resilient compensating means is on the outside of the worm (213) and is made in the form of an elastic stirrup straddling the said worm (213).

9. A friction clutch according to claim 3, characterised by the fact that the support consists of at least one elastic leaf (440, 540), connected on one side to the shaft around which the worm (213) is mounted for rotation, and on the other side to the cover plate (202), the worm (213) being controlled by a diaphragm (203) constituting the axially acting resilient means.

10. A friction clutch according to claim 2, characterised by the fact that the shaft (222) is inclined, with respect to a plane at right angles to the axis of the clutch, by an angle which is generally equal to that of the thread of the worm (212).

11. A friction clutch according to claim 1, characterised by the fact that the set of teeth (218) carried by the ramp means (211) is disposed radially at the inner periphery of the latter.

* * * * *